United States Patent
Hahn et al.

(10) Patent No.: US 11,405,104 B1
(45) Date of Patent: Aug. 2, 2022

(54) METHOD AND SYSTEM FOR LONGITUDINAL PERFORMANCE MONITORING OF AN OPTICAL COMMUNICATION LINE

(71) Applicant: HUAWEI TECHNOLOGIES CO., LTD., Guangdong (CN)

(72) Inventors: Choloong Hahn, Nepean (CA); Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/476,547

(22) Filed: Sep. 16, 2021

(51) Int. Cl.
H04B 10/079 (2013.01)
H04B 10/2513 (2013.01)
H04B 10/61 (2013.01)
H04B 10/58 (2013.01)

(52) U.S. Cl.
CPC ... *H04B 10/0799* (2013.01); *H04B 10/07955* (2013.01); *H04B 10/2513* (2013.01); *H04B 10/58* (2013.01); *H04B 10/61* (2013.01)

(58) Field of Classification Search
CPC .......... H04B 10/0799; H04B 10/07955; H04B 10/2513; H04B 10/58; H04B 10/61
See application file for complete search history.

(56) References Cited

U.S. PATENT DOCUMENTS

| | | | | |
|---|---|---|---|---|
| 6,583,905 B1 * | 6/2003 | Bonato | ................ | H04B 10/255 398/189 |
| 7,310,318 B1 * | 12/2007 | Frankel | ............... | H04J 14/0221 370/480 |
| 8,405,511 B2 * | 3/2013 | Takeshita | ......... | H04B 10/07953 340/600 |
| 10,419,117 B2 | 9/2019 | Tanimura et al. | | |
| 2009/0214201 A1 * | 8/2009 | Oda | ................... | H04B 10/0795 398/25 |
| 2010/0046961 A1 * | 2/2010 | Tanimura | .................. | H03F 3/08 398/208 |
| 2011/0293270 A1 * | 12/2011 | Takeuchi | ......... | H04B 10/25133 398/208 |

(Continued)

OTHER PUBLICATIONS

Tanimura et al., "Fiber-longitudinal anomaly position identification over multi-span transmission link out of receiver-end signals", J. Lightwave Technol., May 2020, pp. 2726-2733, vol. 38, No. 9.

(Continued)

*Primary Examiner* — Mina M Shalaby
(74) *Attorney, Agent, or Firm* — BCF LLP (57) ABSTRACT

Systems and methods for longitudinal performance monitoring of an optical communication line communicably connecting a transmitting device to a receiving device for transmitting a signal therebetween. The method comprises receiving the signal at the receiving device, the signal having been affected by propagative impairments accumulated along the optical communication line, generating, at the receiving device, a linear signal based on the received signal, generating, based on the linear signal, a plurality of signal templates, and determining correlation values between the received signal and each signal template of the plurality of signal templates, each correlation value being indicative of a local longitudinal performance of the optical communication line.

13 Claims, 9 Drawing Sheets

(56) References Cited

U.S. PATENT DOCUMENTS

| | | | | |
|---|---|---|---|---|
| 2012/0051742 | A1* | 3/2012 | Li | H04B 10/6163 |
| | | | | 398/208 |
| 2013/0004162 | A1* | 1/2013 | Osaka | H04B 10/2572 |
| | | | | 398/25 |
| 2013/0094851 | A1* | 4/2013 | Xu | H04B 10/07957 |
| | | | | 398/25 |
| 2015/0043925 | A1* | 2/2015 | Fujisawa | H04B 10/60 |
| | | | | 398/208 |
| 2015/0288458 | A1* | 10/2015 | Honda | H04J 14/02 |
| | | | | 398/81 |
| 2015/0330835 | A1* | 11/2015 | Yamauchi | H04B 10/07953 |
| | | | | 250/214 C |
| 2016/0050025 | A1* | 2/2016 | Yasuda | H04B 10/6165 |
| | | | | 398/65 |
| 2016/0056890 | A1* | 2/2016 | Böldicke | H04B 10/0731 |
| | | | | 398/25 |
| 2018/0205461 | A1* | 7/2018 | Alfiad | H04B 10/25133 |
| 2018/0248618 | A1* | 8/2018 | Li | H04B 10/6161 |
| 2021/0306073 | A1* | 9/2021 | Yoshida | H04B 10/6161 |

OTHER PUBLICATIONS

Sasai et al., "Digital Backpropagation for Optical Path Monitoring: Loss Profile and Passband Narrowing Estimation", 2020 European Conference on Optical Communications (ECOC), Dec. 2020, pp. 1-4, doi: 10.1109/ECOC48923.2020.9333191.

* cited by examiner

METHOD AND SYSTEM FOR LONGITUDINAL PERFORMANCE MONITORING OF AN OPTICAL COMMUNICATION LINE

CROSS-REFERENCE TO RELATED APPLICATIONS

This is the first application filed for the instantly disclosed technology.

FIELD OF THE TECHNOLOGY

The present disclosure generally relates to the field of optical communications and, in particular, to methods and systems for longitudinal performance monitoring of an optical communication line.

BACKGROUND

Typical implementation of optical networks, such as, for example, dense wavelength division multiplex (DWDM) networks, involve enormous number of optical devices and optical communication lines making standard monitoring systems inefficient. Moreover, during propagation of an optical signal along an optical communication line between a transmitting device and a receiving device, various impairments may appear such as chromatic dispersion, polarization dependent loss, nonlinear noise, multi-path interference (MPI), and optical filter misalignments. At the receiving device, a total accumulated amount of those impairments may typically be detected. However, determination of locations of the sources of those impairments in the optical communication line remains an arduous and cumbersome task given that this determination typically requires a plurality of sensors integrated along the optical communication line by current solutions. Those solutions thus require heavy modification of the existing infrastructures.

Therefore, there remains an interest in being able to do location resolved longitudinal detection of impairments without additional systems added on the optical communication line.

SUMMARY

An aspect of the present disclosure is to provide a method for longitudinal performance monitoring of an optical communication line communicably connecting a transmitting device to a receiving device for transmitting a signal therebetween, the method comprising: receiving the signal at the receiving device, the signal having been affected by propagative impairments accumulated along the optical communication line; generating, at the receiving device, a linear signal based on the received signal; obtaining, based on the linear signal, a plurality of signal templates; and determining correlation values between the received signal and each signal template of the plurality of signal templates, each correlation value being indicative of a local longitudinal performance of the optical communication line.

In at least one embodiment, the obtaining, based on the linear signal, a plurality of signal templates comprises generating, based on the linear signal, a plurality of signal templates or obtaining a a plurality of pre-defined signal templates.

In at least one embodiment, a plurality of segments is defined along the optical communication line, each signal template corresponding to one of the plurality of segments, each signal template approximating an expression of an impairment affecting the signal between a location of the corresponding segment and the receiving device.

In at least one embodiment, the expression of the impairment affecting the signal is an expression of accumulated non-linear distortions of the signal between the location of the corresponding segment and the receiving device.

In at least one embodiment, the correlation values are indicative of a power distribution of the signal along the optical communication line.

In at least one embodiment, the propagative impairments comprise chromatic dispersion and non-linear distortions, and wherein obtaining, based on the linear signal, a plurality of signal templates comprises: determining, at the receiving device, a total chromatic dispersion accumulated by the received signal between the transmitting device and the receiving device, each segment of the optical communication line adding a corresponding portion of the total chromatic dispersion; and for a given signal template of the plurality of signal templates: determining, based on a location of the segment corresponding to the given signal template and on the total chromatic dispersion, a waveform of the linear signal at the location of the segment; executing a non-linear distortion operation onto said waveform, the non-linear distortion operation emulating non-linear distortions affecting the signal at the location of the segment, thereby generating a non-linear signal; and executing a chromatic dispersion operation to the non-linear signal, the chromatic dispersion operation emulating an accumulation of chromatic dispersion by the non-linear signal between the location of the segment and the receiving device, thereby generating the given signal template.

In at least one embodiment, the method further comprises determining, based on an evolution of the correlation values along the optical communication line, a location of a source of a local impairment in the optical communication line.

In at least one embodiment, the source of the local impairment is a set of points of the optical communication line causing partial reflection of the signal and causing Multi-Path Interference (MPI) occurring in the optical communication line, the MPI occurring between a first component of the signal and a second component of the signal, the second component of the signal having been reflected at least twice in the optical communication line, the MPI thereby generating non-linear distortions corresponding to interferences between the first and second components of the signal.

In at least one embodiment, each signal template is representative of non-linear distortion accumulated between a location of the corresponding segment and the receiving device.

In at least one embodiment, obtaining, based on the linear signal, a plurality of signal templates comprises: determining, at the receiving device, a total chromatic dispersion accumulated by the received signal between the transmitting device and the receiving device, each segment of the optical communication line adding a corresponding portion of the total chromatic dispersion; and for a given signal template of the plurality of signal templates: determining, based on a location of the segment corresponding to the given signal template and on the total chromatic dispersion, waveforms of the first, second and third components of the signal at the location of the segment; and executing a non-linear distortion operation onto said waveforms, the non-linear distortion operation emulating non-linear distortions at the location of the segment, thereby generating the given signal template.

In at least one embodiment, receiving the signal at the receiving device comprises collecting the signal with an optical photodetector and converting an output of the optical photodetector into a digital signal by an analogue-to-digital converter.

In at least one embodiment, generating the linear signal comprises executing, by a signal processor, a logic symbol decision procedure on the received signal.

In at least one embodiment, the method further comprises, subsequent to generating the plurality of signal templates, applying a signal frequency filter to the received signal and the plurality of signal templates.

In at least one embodiment, determining correlation values between the received signal and each signal template of the plurality of signal templates comprises, for a given signal template: executing a bilinear correlation operation using the received signal and the given signal template as parameters, the correlation operation outputting a non-null value for portions of the parameters that are in common and a null value otherwise.

BRIEF DESCRIPTION OF THE FIGURES

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "controller", "processor" or "processing unit", may be provided through the use of dedicated hardware as well as hardware capable of executing software in association with appropriate software and according to the methods described herein. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules or units which are implied to be software, may be represented herein as any combination of flowchart elements or other elements indicating performance of process steps and/or textual description. Such modules may be executed by hardware that is expressly or implicitly shown, the hardware being adapted to (made to, designed to, or configured to) execute the modules. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present disclosure.

Broadly speaking, the present technology provides a system and a method for longitudinal performance monitoring of an optical communication line, the optical communication line being configured to communicably connect a transmitting device to a receiving device for transmitting a signal therebetween. In one embodiment, the present technology uses propagative impairments such as chromatic dispersion and non-linear distortions accumulated by the signal as a parameter representative of a position in the optical communication line. More specifically, a given amount of chromatic dispersion may be associated with a given position along the optical communication line. Indeed, chromatic dispersion in a dispersion-uncompensated optical communication line may be used as a "fingerprint" of the signal, given that the chromatic dispersion gives a unique signal waveform to the transmitted signal at each position along the optical communication line. In one embodiment, a plurality of signal templates is generated at the receiving device such that a corresponding plurality of correlation values between the received signal and the templates signals may be determined, each correlation value being indicative of a local power of the transmitted signal in the optical communication line. As such, power distribution of the signal along the optical communication line may be determined based on the plurality of correlation values.

In another embodiment, the present technology provides a system and a method for determining a location of a source of a local impairment in the optical communication line. In this embodiment, the signal templates may be chosen such that correlation values are indicative of interferences occurring within the optical communication line. As such, locations of sources of local impairment, such as a location of a multi-path interference (MPI) source, may be determined based on the correlation values.

Figure 1:
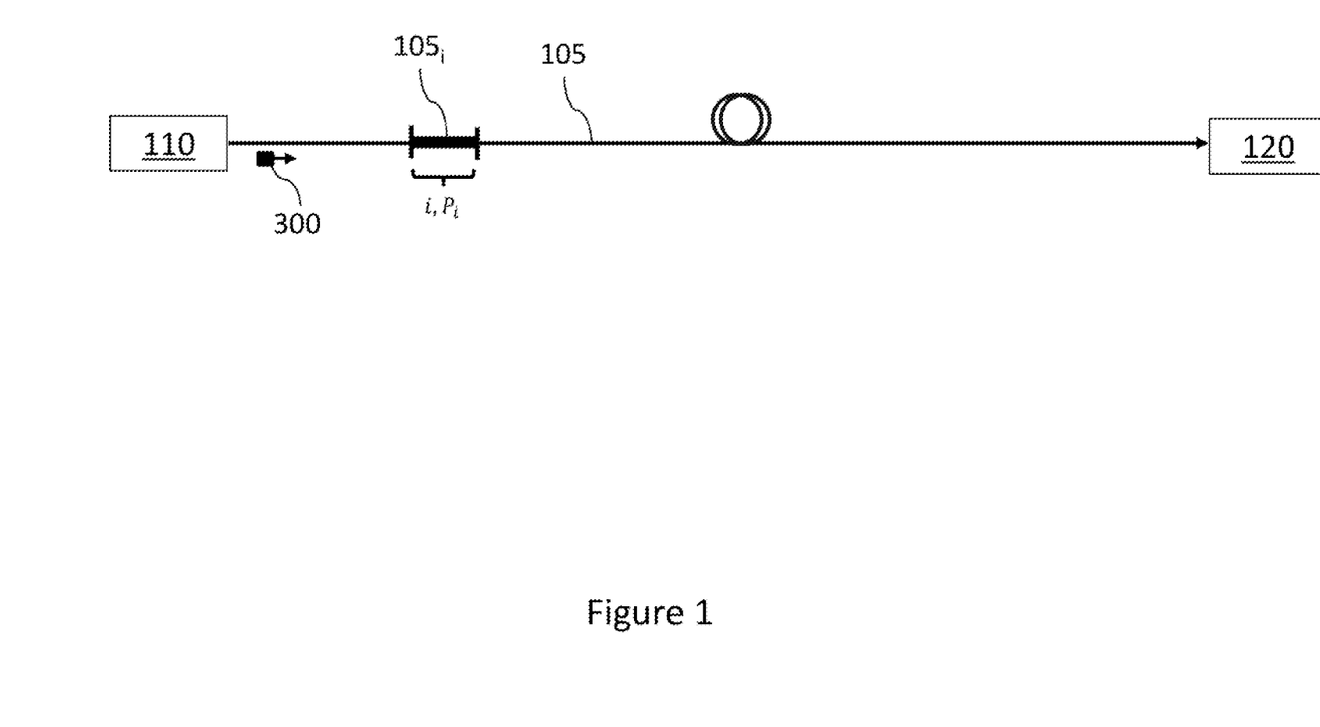
FIG. 1 is a high-level diagram of an optical communication line.

With reference to FIG. 1, a high-level diagram of an optical communication line 105 is illustrated. The optical communication line 105 communicably connects a transmitting device 110 to a receiving device 120 for transmitting an optical signal 300 therebetween. The optical communication line 105 may be a conventional optical fiber such as, for example, a glass fiber surrounded by one or more coating layers. The optical communication line 105 may include an optical fiber core which transmits the optical signal 300, and an optical cladding, which confines the optical signal within the optical fiber core. It is also contemplated that light emitted by the transmitting device 110, thereby defining the optical signal 300, may be single polarized, dual polarized, or randomly polarized, may have a particular polarization (e.g. linearly polarized, elliptically polarized, or circularly polarized).

In this embodiment, a plurality of segments i of a same length are defined along the optical communication line 105, each segment i being associated with a corresponding position and an average power $P_i$ of the optical signal 300 along the segment i. As such, in the context of the present disclosure, a number N of segments are defined along the optical communication line 105.

In the context of the present technology, the optical signal 300 at location i on the optical communication line 105 is represented, without non-linearity distortions (NLD), as a normalized signal $u(CD_i, t)$ where $CD_i$ is the chromatic dispersion accumulated during a propagation of the optical signal 300 from the transmitting device 110 to location i, and t is the time from the transmission of the optical signal 300. As mentioned herein before, the chromatic dispersion is a propagative impairment that causes the waveform of the optical signal 300 to vary in such a manner that a waveform of the optical signal after having propagated along a given distance in the optical communication line is unique and, as such, representative of said distance. The amount of chromatic dispersion may thus, in the context of the present technology, be representative of a position of the optical signal 300 along the optical communication line 105. For example, given a total chromatic dispersion CD detected on the optical signal at the receiver 120, and given that the optical communication line 105 may be partitioned in N segments, an amount of chromatic dispersion linearly accumulated by the optical signal between the transmitting device 110 and a segment i is $CD_i = i \cdot \Delta CD$ where $\Delta CD = CD/N$.

In one aspect, the present technology uses NLD, another propagative impairment, introduced during propagation of the optical signal 300, due for instance to the Kerr effect, to retrieve information representative of a power of the optical signal 300 at a given segment i. More specifically, due to NLD, the normalized optical signal 300 at location i may be written as:

$$u_{NL}(CD_i, t) = u(CD_i, t) e^{-jP_i \gamma |u(cD_i, t)|^2} \quad (1)$$

where j is the complex number, $P_i$ is power of the optical signal 300 at location i, and $\gamma$ is nonlinear coefficient of the optical communication line 105.

A development of the exponential expression of equation (1) gives:

$$u_{NL}(CD_i, t) = u(CD_i, t) - jP_i \gamma |u(CD_i, t)|^2 u(CD_i, t) \quad (2)$$

In equation (2), second and higher order terms of the development in series have been ignored given that NLD is typically negligible above the first order. It should also be noted that the nonlinearity of NLD before the location i has been ignored in above equations (1) and (2) because it is typically negligible. Therefore, the NLD can be treated as additive to the linear signal. Indeed, the optical signal $u_{NL}(CD_i, t)$ effectively received by the receiving device 120 is the sum of the linear part $u(CD_i, t)$ and the non-linear part $-jP_i\gamma|u(CD_i, t)|^2 u(CD_i, t)$.

As such, upon reception of the optical signal at the receiver 120, the non-linear part is:

$$P_i \Delta u_{NL}(CD_i, t) = P_i H(-j\gamma |u(CD_i, t)|^2 u(CD_i, t), CD_N - CD_i) \quad (3)$$

where, function H(u(t), CD) adds chromatic dispersion (CD) to the optical signal.

As such, the optical signal 300 received at the receiving device 120 is a sum of the linear signal with non-linear distortions having accumulated chromatic dispersion from all the segments i, which can be written as follows:

$$u_{NL}(CD_N, t) = u(CD_N, t) + \sum_{k=1}^{N} P_k \Delta u_{NL}(CD_k, t) \quad (4)$$

Figure 2:
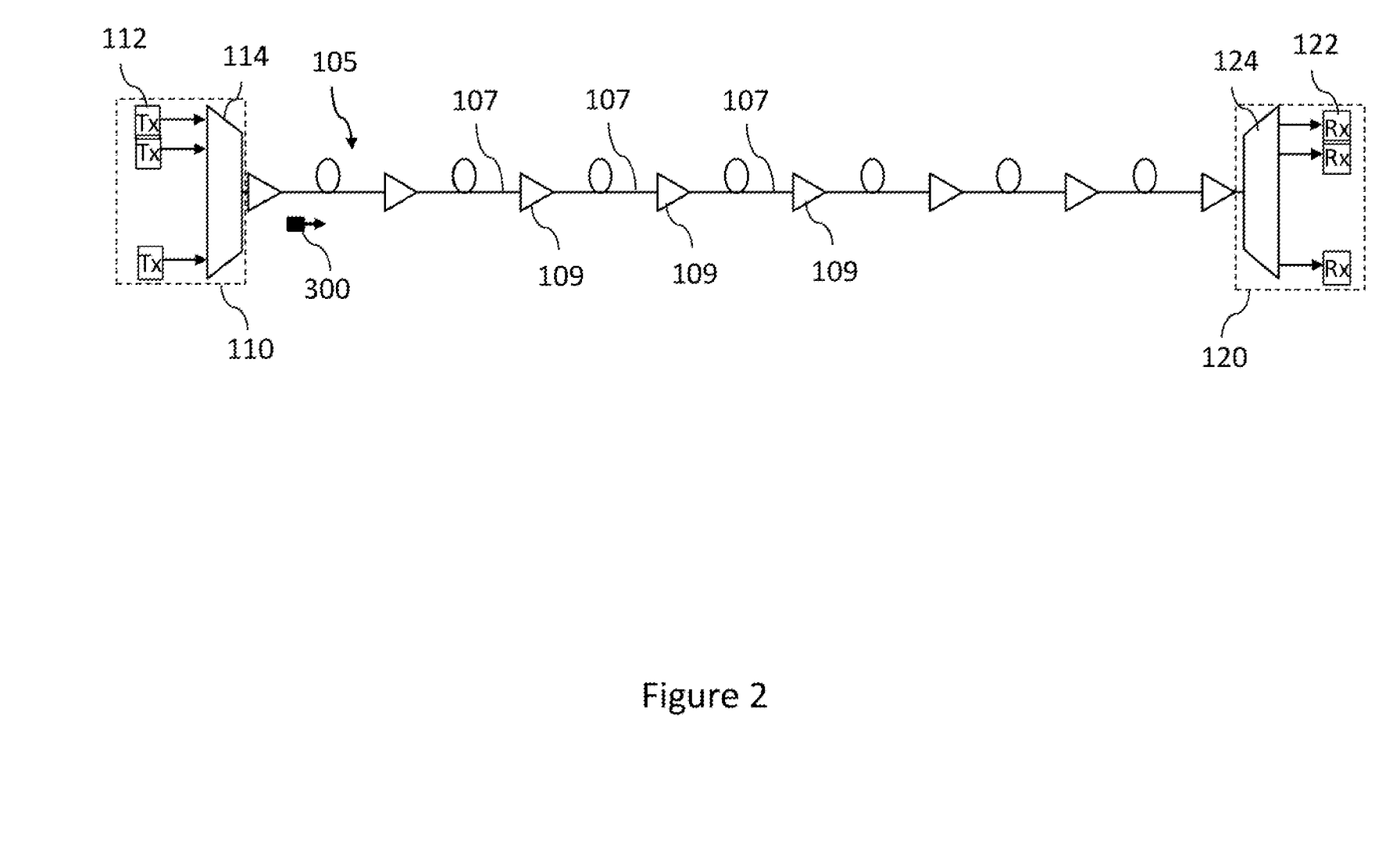
FIG. 2 is a schematic of an optical communication line in accordance with some embodiments of the present technology.

FIG. 2 is a schematic of the optical communication line 105 in accordance with one embodiment of the present technology. As depicted, the optical communication line 105 may comprise a plurality of optical amplifiers 109 (e.g., erbium-doped fiber amplifiers (EDFAs)) and placed in a sequence for amplifying the optical signal along the optical communication line 105. Use of one or more additional optical network elements and modules (which may include either or both of active and passive elements/modules), such as, for example, optical filters, Wavelength Selective Switches (WSSs), arrayed waveguide gratings, optical transmitting devices, optical receiving devices, processors and other suitable components along the optical communication line 105 is also contemplated in alternative embodiments.

In a non-limiting embodiment, each segment i corresponds to a portion 107, or "span" 107, of the optical communication line 105 comprised between two consecutive amplifiers 109. In another non-limiting embodiment, each span 107 comprises at least two segments.

In this embodiment, the transmitting device 110 comprises a plurality of transmitters 112, each transmitter 112 being configured to emit a given signal such that the plurality of emitted signals is combined by a multiplexer 114 operatively coupled to the optical communication line 105. For example and without limitation, each transmitter 112 may be a laser source of a respective wavelength and communicatively connected to a corresponding processing unit (not shown) comprised in the transmitting device 110. The laser source may be configured to produce, emit, or radiate pulses of light with certain pulse duration. In certain embodiments, one or more transmitters 112 implemented as pulsed laser light sources may comprise one or more laser diodes, such as but not limited to, Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. The multiplexer 114 may be a passive multiplexer such as, without limitation, a prism-based or a mirror-based multiplexer, or an active multiplexer based on a combination of passive components and tunable detectors, each detector being tuned to a specific frequency.

In this embodiment, the receiving device 120 comprises a demultiplexer 124 operatively coupled to the optical communication line 105 and configured to receive the optical signal and 300 to output a plurality of output signals, each output signal being further directed to a corresponding receiver 122 of the receiving device 120. For example, the demultiplexer 124 may be configured to output the outputs signals based on wavelength, such that each receiver 122 corresponds to one of the transmitters 112. More specifically, the demultiplexer 124 may separate the optical signal 300, comprising the plurality of wavelengths emitted by the plurality of transmitters 112, into its wavelength components. The demultiplexer 124 may be a passive multiplexer, such as without limitation a prism-based, diffraction grating-based, or spectral filter-based demultiplexer, or an active demultiplexer based on a combination of passive components and tunable detectors, each detectors being tuned to a specific frequency. In this embodiment, the receivers 122 are photodiodes, each receiver 122 having its central wavelength corresponding to the wavelength emitted by its corresponding transmitter 112. Other types of receivers 122 are contemplated in alternative embodiments.

Figure 3A:
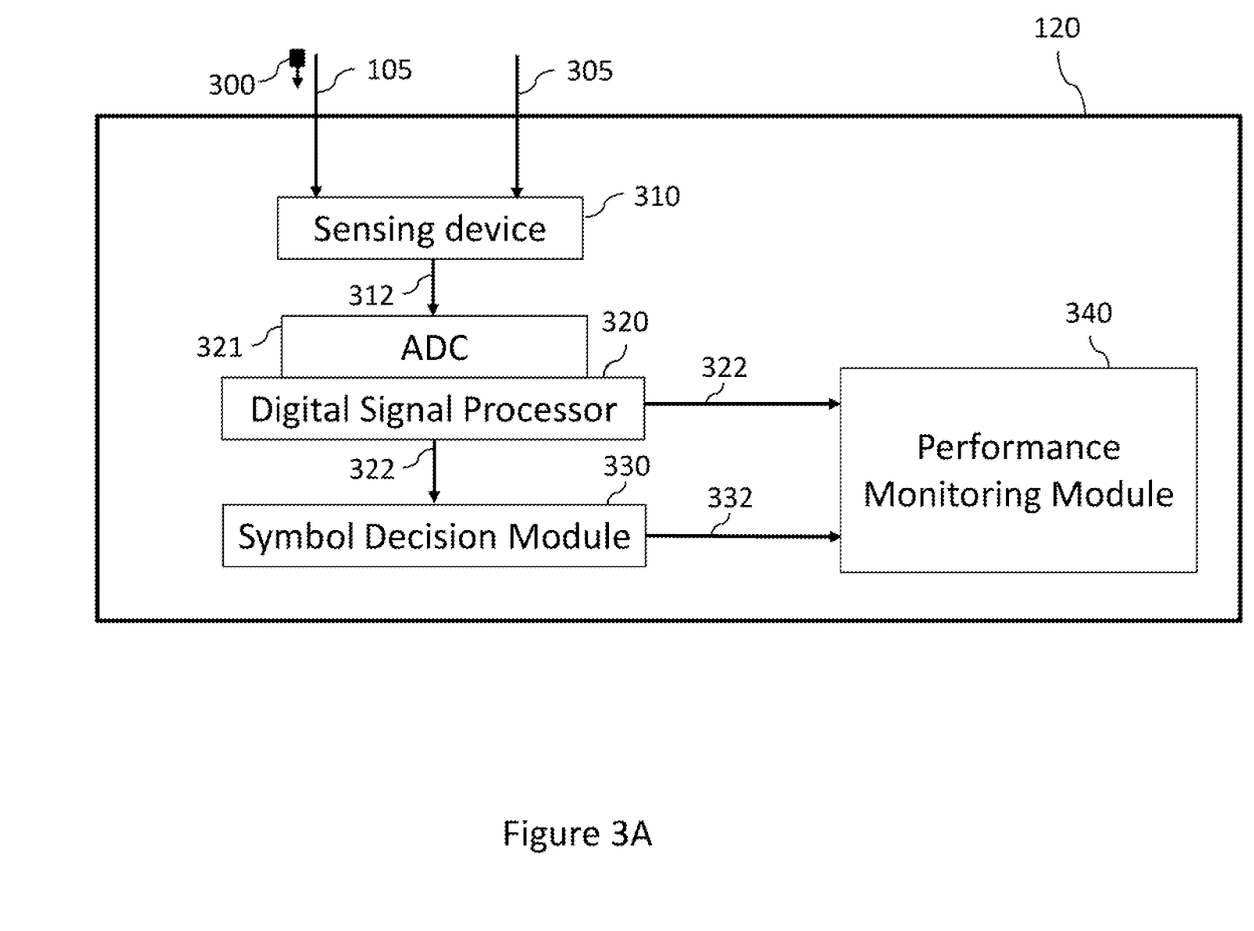
FIG. 3A is a block-diagram of a receiving device communicably coupled to the optical communication line of FIG. 2 in accordance with some embodiments of the present technology.

With respect to FIG. 3, the demultiplexer 124 and the plurality of receivers 122 are comprised in a sensing device 310 of the receiving device 120. As such, the sensing device 310 may be a photodiode of an integrated coherent receiver. Broadly speaking, the sensing device 310 may receive the optical signal 300 from the optical communication line 105 and transmit an analogue signal 312 to an analog-to-digital converter (ADC) 321. In this embodiment, the ADC 321 is communicably connected to a digital signal processor (DSP) 320 configured to generated, based on digitally converted optical signal 300 and a local oscillator signal 305, the optical signal 300 with NLD: $u_{NL}(CD_N, t)$ as a digital signal 322. As an example and without limitation, the local oscillator signal 305 may be generated by a oscillator (not shown) implemented in the receiving device 120. In this embodiment, the DSP 320 may determine the amount of chromatic dispersion $CD_N=CD$ accumulated in the digital signal 322 $u_{NL}(CD_N, t)$. As such, given that the number N of segments defined in the optical communication line 105 is known, the first chromatic dispersion module 344 may determine a segmental amount of chromatic dispersion $\Delta CD=CD/N$ that has been linearly accumulated by the optical signal 300 at each segment i along the optical communication line 105.

The receiving device 120 also comprises a symbol decision module 330 that receives the digital signal 322 representative of $u_{NL}(CD_N, t)$ and the local oscillator signal 305. In this embodiment, the receiving device 120 comprises a symbol decision module 330 that may execute symbol decision procedures to generate a digital signal 332 representative of the linear part of the optical signal 300. Indeed, the symbol decision procedure may be executed to generate the digital signal 332 without NLD. As such, an approximation of the linear part $u(CD_N, t)$ by the digital signal 332 inherently depends on the symbol decision procedure.

In the context of the present disclosure the digital signals 322 and 332 will be treated as the respective analogue signals that they represent, for simplicity and clarity of mathematical operations. As such, a mathematical expression of the digital signal 322 is $u_{NL}(CD_N, t) = u(CD_N, t) + \sum_{k=1}^{N} P_k \Delta u_{NL}(CD_k, t)$ and a mathematical expression of the digital signal 332 is $u(CD_N, t)$.

In this embodiment, the digital signals 322, 332 are transmitted to a performance monitoring module 340 configured for monitoring longitudinal performance of the optical communication line 105. As such, the performance monitoring module 340 receives the signals $u_{NL}(CD_N, t)$ and $u(CD_N, t)$.

Figure 3B:
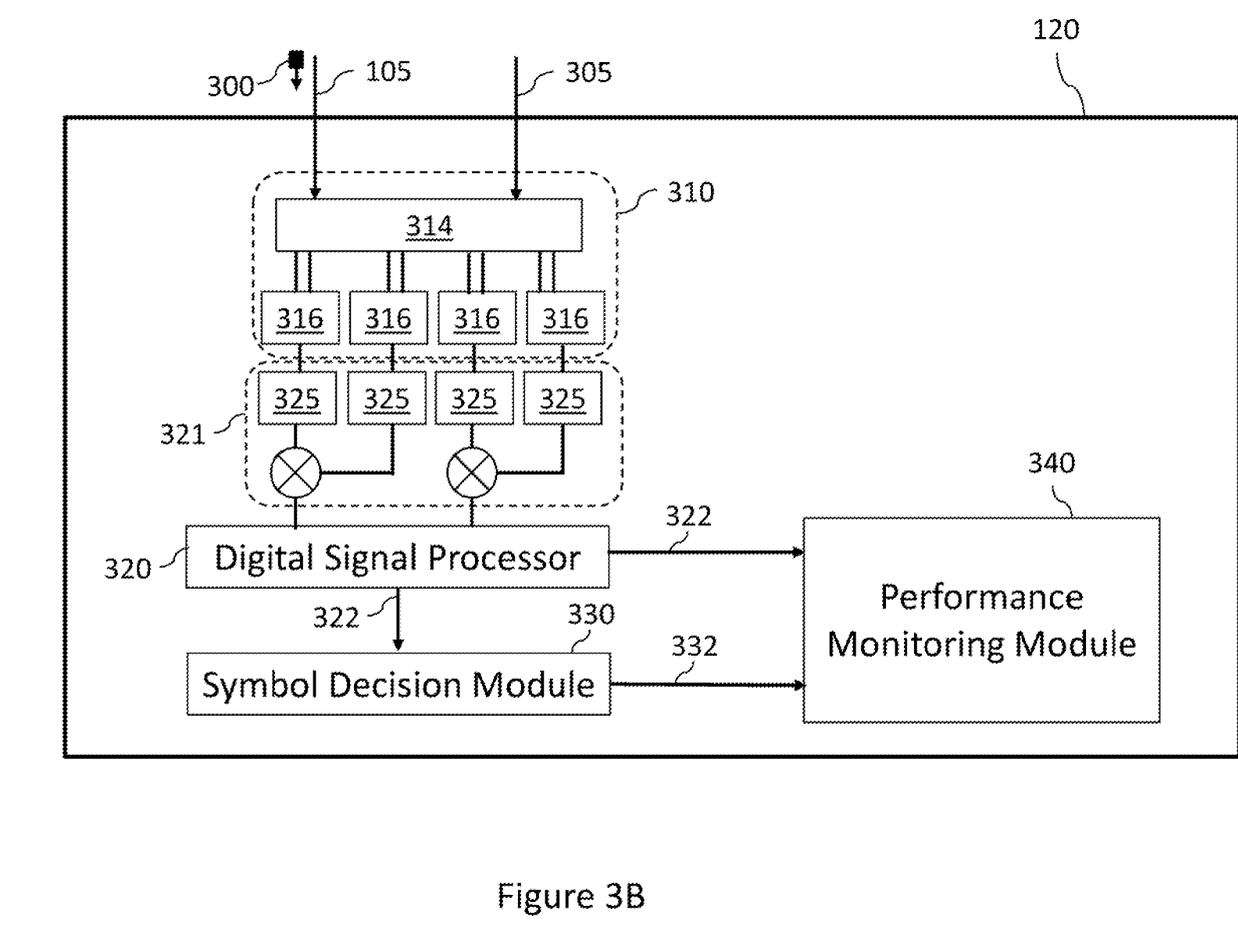
FIG. 3B is another block-diagram of the receiving device communicably coupled to the optical communication line of FIG. 2 in accordance with some other embodiments of the present technology.

With respect to FIG. 3B, an embodiment of the receiving device 120 is described in greater details. More specifically, in this embodiment, the receiving device 120 is a coherent receiver. As such, the sensing device 310 may comprise a polarity and phase diversity hybrid module 314 and balanced photodiodes 316. Only four balanced photodiodes are depicted on FIG. 3B, a different number of balanced photodiodes 316 (e.g. eight) is contemplated in alternative embodiments of the present technology. The polarity and phase diversity hybrid module 314 may comprise polarized beam splitters (e.g. two polarized beam splitters) and hybrid frequency mixers (e.g. two 90° hybrid mixers, a first 90° hybrid mixer for receiving X-polarized components, and a second 90° hybrid mixer for receiving Y-polarized components), the polarized beam splitters directing components of the optical signal 300 and the local oscillator signal 305 to each of the hybrid frequency mixers. The hybrid frequency mixers decompose in-phase and quadrature channels of the optical signal 300 and the local oscillator signal 305. Each balanced photodiode 316 further transmits its corresponding output to an ADC module 325 of the ADC 321. In this illustrative embodiment, the ADC 321 may further sum signals outputted by the ADC module 325 for each polarity before transmitting the summed signals to the DSP 320.

Figure 4:
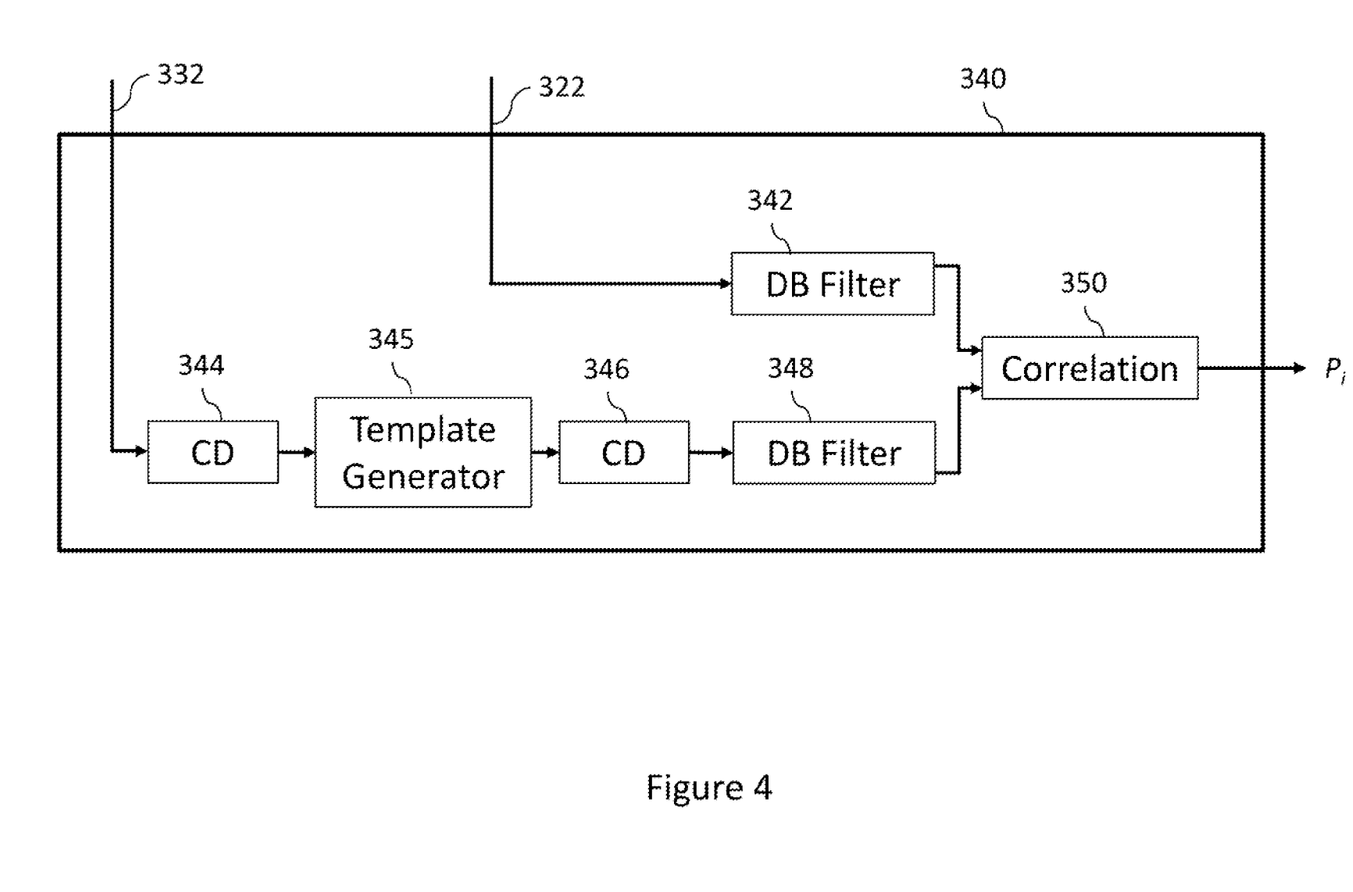
FIG. 4 is a block-diagram of a performance monitoring module of the receiving device of FIG. 3 in accordance with some embodiments of the present technology.

Broadly speaking, with reference to FIG. 4, the performance monitoring module 340 may generate a plurality of signal templates based on the digital signal 322 $u_{NL}(CD_N, t) = u(CD_N, t) + \Sigma_{k=1}^{N} P_k \Delta u_{NL}(CD_k, t)$ representative of the signal received at the receiving device 120. In this embodiment, each signal template corresponds to a given segment i of the optical communication line 105.

The performance monitoring module 340 may further determine correlations values between the received digital signal 322 and each signal template, each correlation value being determined based on one of the signal templates. As such, in this embodiment, each correlation value corresponds to a given segment i of the optical communication line 105. Given a definition of the signal templates, the correlation values may be indicative of a longitudinal power profile of the optical signal 300 along the optical communication line 105 and/or indicative of an amount of impairment having affected the first signal at a corresponding location in the optical communication line.

More specifically, the performance monitoring module 340 may execute signal processing operations onto the digital signals 322, 332 to determine the aforementioned correlation values. The following examples are directed to determination of the correlation value corresponding to a given segment i of the optical communication line 105. In this embodiment, the performance monitoring module 340 comprises a first chromatic dispersion module 344 for generating a linear signal $u(CD_i, t)$ by determining the amount of chromatic dispersion $CD_i = \Delta CD \cdot i$ accumulated by the optical signal 300 between the transmitting device 110 and the segment i. More specifically, the first chromatic dispersion module 344 execute the operation $H(u(CD_N, t), -(CD_N - CD_i)) = u(CD_i, t)$ corresponding to compensating chromatic dispersion accumulated by the signal between the segment i and the receiving device 120, where H is an operator of chromatic dispersion accumulation models.

The performance monitoring module 340 also comprises a template generator module 345 for converting the signal $u(CD_i, t)$ into a non-linear distortion $-j\gamma|u(CD_i, t)|^2 u(CD_i, t)$, where $\gamma$ is a nonlinear coefficient of the optical communication line 105. As such, generation of the term $-j\gamma|u(CD_i, t)|^2 u(CD_i, t)$ may be referred as to executing a non-linear distortion operation to emulate the actual NLDs affecting the linear signal $u(CD_i, t)$.

In this embodiment, the performance monitoring module 340 may also comprise a second chromatic dispersion module 346 that may add residual chromatic dispersion to the non-linear distortion $-j\gamma|u(CD_i, t)|^2 u(CD_i, t)$ such that chromatic dispersion of the non-linear distortion $-j\gamma|u(CD_i, t)|^2 u(CD_i, t)$ matches chromatic dispersion accumulated by the signal 322 (e.g. by adding chromatic dispersion corresponding to chromatic dispersion accumulated by the optical signal 300 between the segment i and the receiving device 120, the second chromatic dispersion module 346 executing the operator H such that:

$$H(-j\gamma|u(CD_i,t)|^2 u(CD_i,t), CD_N - CD_i) = \Delta u_{NL}(CD_i,t) = T_P(CD_i) \quad (5)$$

The signal template $T_P(CD_i)$ is thus generated. It is contemplated that operations executed by the first chromatic dispersion module 344, the template generator module 345 and the second chromatic dispersion module 346 may be executed at once by the controller according to equation (5) in alternative embodiments. Other definitions of the signal template are contemplated in alternative embodiments of the present technology.

In the above description of the first chromatic dispersion module 344, the template generator module 345 and the second chromatic dispersion module 346, it is assumed that chromatic dispersion accumulated by the signals 322 and 332 received by the performance monitoring module 340 both matches $CD_N$. In alternative embodiments, the DSP 320 may be adapted to compensate chromatic dispersion accumulated by either one or both of the signals 332, 322 such that operations executed by the first and second chromatic dispersion module 344, 346 may differ from the above-described operations. As such, implementation of the performance monitoring module 340, and more specifically implementations of the first chromatic dispersion module 344 and the second chromatic dispersion module 346 thus depends inter alia of an implementation of the DSP 320. For example, compensating chromatic dispersion at the first chromatic dispersion module 344 may not be executed in response to the chromatic dispersion having been compensated by the DSP 320 on the signal 332. Similarly, as an example, adding chromatic dispersion at the second chromatic dispersion module 346 may not be executed in response to the chromatic dispersion having been compensated by the DSP 320 on the signal 322.

Optionally, in at least one embodiment, the performance monitoring module 340 may comprise a first and a second digital block filters 342, 348, respectively receiving the digital signal 322 and the signal template $T_P(CD_i)$. The first and second digital block filters 342, 348 may have a same transfer function to increase a spatial resolution of the performance monitoring of the optical communication line 105.

The signal template $T_P(CD_i)$ and the digital signal 322 are further transmitted to a correlation module 350 of the performance monitoring module 340. In this embodiment, the correlation module 350 executes a correlation operation between the signal template $T_P(CD_i)$ and the digital signal 322, the correlation value of the segment i corresponding to a result of the correlation operation. Based on the previous definition of the signal template $T_P(CD_i)$, the correlation operation may be developed as follows:

$$\text{corr}(u_{NL}(CD_N, t), T_P(CD_i)) = \quad (6)$$
$$\text{corr}(u(CD_N, t), T_P(CD_i)) + P_i \text{corr}(\Delta u_{NL}(CD_i, t), T_P(CD_i)) +$$

-continued $$\text{corr}\left(\sum_{k=1,k\neq i}^{N} P_k \Delta u_{NL}(CD_k, t), T_P(CD_k)\right)$$

in which equation (6) is based on equation (4) where corr(x,y) is a bilinear operation returning 1 if x and y are equal, and 0 otherwise.

The first term $\text{corr}(u(CD_N, t), T_P(CD_i))$ of the development corresponds to the correlation between the linear part $u(CD_i, t)$ of the optical signal 300 and the signal template $T_P(CD_i)$. Based on the definition of the signal template, no correlation is expected between the two, such that $\text{corr}(u(CD_N, t), T_P(CD_k))=0$.

The third term $$\text{corr}\left(\sum_{k=1,k\neq i}^{N} P_k \Delta u_{NL}(CD_k, t), T_P(CD_k)\right)$$

corresponds to the correlation between the NLDs generated at segments that are different from segment i. Given that NLDs generated at a given segment are, in principle, not correlated to the NLDs generated at another segment, the third term is also null.

However, since the signal template for a given segment i has been defined as $T_P(CD_i)=\Delta u_{NL}(CD_i, t)$, the second terms gives $P_i \text{corr}(\Delta u_{NL}(CD_i, t), T_P(CD_i))=P_i$.

As such, the correlation value determined for the generated signal template $T_P(CD_i)=\Delta u_{NL}(CD_i, t)$ is the average power $P_i$ of the optical signal 300 along the segment i. In this embodiment, the performance monitoring module 340 determines, sequentially or in parallel, the correlation values for each segment defined along the optical communication line 105. In this example, the performance monitoring module 340 determines the plurality of average power values $\{P_k\}_{k\in[1,N]}$ representative of the spatial distribution of the power of the optical signal 300 along the optical communication line 105. As such, a location of a source of a local impairment affecting the power of the optical signal 300 may be detected based on the average power value $P_i$ for each segment i. For example, a local undesired increase or decrease of the optical power in the optical communication line 105 may be detected based on the plurality of correlation values $\{P_k\}_{k\in[1,N]}$.

Figure 5:
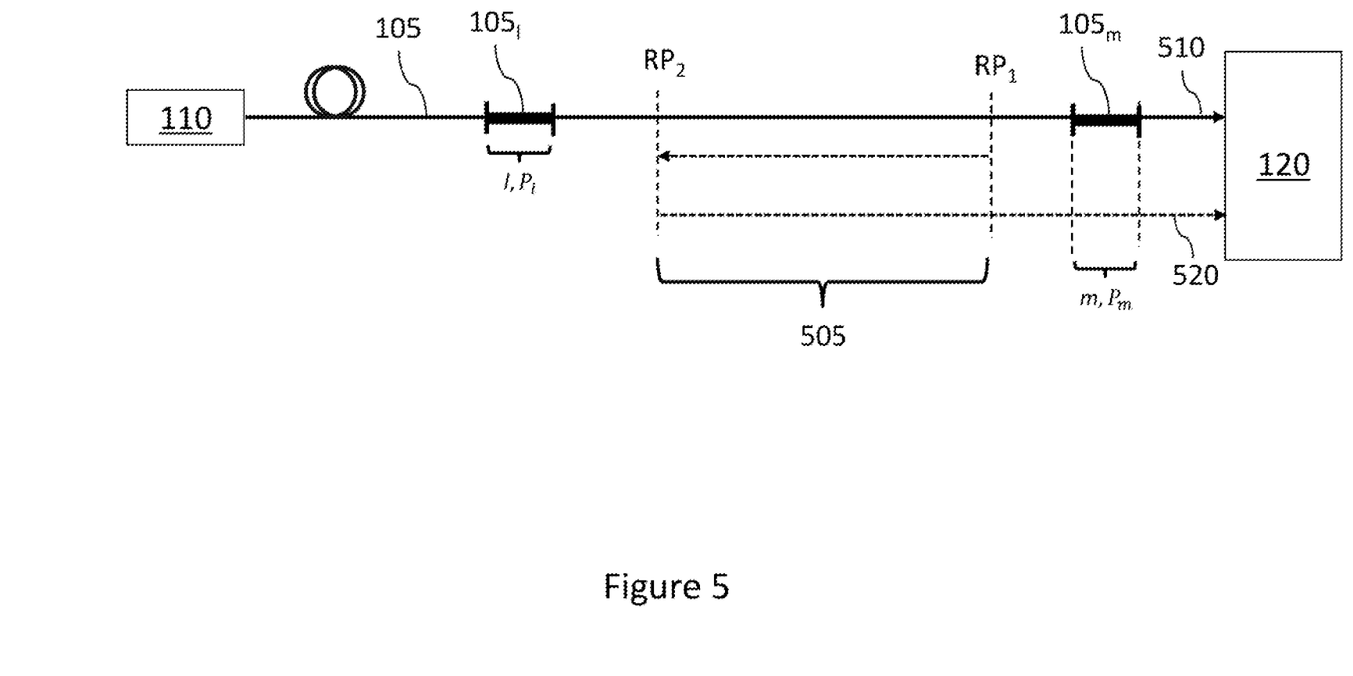
FIG. 5 is a high-level diagram of an optical communication line comprising a multi-path interference (MPI) in accordance with some embodiments of the present technology.

As previously described, other definitions of the signal templates may be used to characterize other aspects of the optical communication line 105. As another illustrative example, FIG. 5 illustrates the optical communication line 105 extending between the transmitting device 110 and the receiving device 120, a multi-path interference (MPI) source 505 being located between a first segment/and a second segment m. More specifically, the MPI source 505 comprises a first reflection point $RP_1$ and a second reflection point $RP_2$, $R_1$ and $R_2$ being reflection coefficients of the first and second reflection points $RP_1$ and $RP_2$ respectively. In order to ease a reading of the present disclosure, the different optical signals involved in the MPI are defined as $u_M(CD_l, t)$ being a main optical signal 510 at segment l, and $u_R(CD_m, t)$ being a reflected signal 520 at the segment m between the MPI source 505 and the receiving device 120, the reflected signal 520 propagating from the MPI source 505 to the receiving device 120. Therefore, only the main optical signal exists between the transmitting device 110 and the MPI source 505, while the main signal 510 and the reflected signal 520 exist between the MPI source 505 and the receiving device 120.

As such, the reflected signal may be written as $u_R(CD_m, t')=\sqrt{R}u_M(t+\tau_R, CD_m)$ where $\tau_R$ is a time delay of the reflected signal 520 induced by the MPI source 505 due to the two reflections at $RP_1$ and $RP_2$, and $R=R_1R_2$. In the context of the present disclosure, the reflection $RP_1$ is assumed to occur close enough to the reflection $RP_2$ such that chromatic dispersion accumulated by the optical signal 300 may be neglected with respect to the total accumulated chromatic dispersion $CD_N=\Delta CD \cdot N$. In the event of a longer distance between the two reflections at $RP_1$ and $RP_2$, a reflected signal from $RP_1$ to $RP_2$ may not have enough power due to propagation loss experienced between the two reflections at $RP_1$ and $RP_2$. As such, this reflected signal may be neglected with respect to the main optical signal 510 and the reflected signal 520.

It should be understood that a coexistence of the main signal 510 and the reflected signal 520 between the MPI source 505 and the receiving device 120 generates non-linear distortions from the two signals such that the non-linear distortion of the signal $u_{NL}(CD_N, t)$ received by the receiving device 120 is the addition of the non-linear distortions from the two signals with a third term representative of a combination of the main signal 510 and the reflected signal 520. As such, the received non-linear distortion comprises three components: a first component being generated by the main signal $u_M(CD_N, t)$, a second component being generated by the reflected signal $u_R(CD_N, t)$, and a third component being generated by a combination of the main and reflected signals.

More specifically, at any segment/between the transmitting device 110 and the MPI source 505, the optical signal 300 may be written, due to NLDs, as follows:

$$u_M(CD_l, t)e^{-jP_l\gamma|u_M(CD_l, t)|^2} = u_M(CD_l, t) - \qquad (7)$$
$$jP_l\gamma|u_M(CD_l, t)|^2 u_M(CD_l, t)$$
$$= u_M(CD_l, t) + NLD(u_M(CD_l, t))$$

where NLD($\cdot$) represents the approximation of the non-linear distortions according to equation (2).

Besides, at any segment m between the MPI source 505 and the receiving device 120, the optical signal 300 may be written, due to the NLDs, as follows:

$(u_M(CD_m, t)+u_R(CD_m, t+\tau_R))e^{-jP_m\gamma|u_M(CD_m, t)+u_R(CD_m, t+\tau_R)|^2}$ As such, due to interference between the main signal 510 and the reflected signal 520, NLDs at a segment m between the MPI source 505 and the receiving device 120 may be written as:

$NLD(u_{NL}(CD_m, t))=NLD(u_m(CD_k, t))+$
$NLD(u_R(CD_m, t+\tau_R))+CS(CD_m, t)$ where CS is the portion of NLD accumulated by the combination (e.g. interferences) of the main and reflected signals 510, 520.

In this example for detection of a location of the MPI source 505, the template generator module 345 of the performance monitoring module 340 may generate, for a given segment i, a signal template having the following expression:

$T_{MPI}(CD_i)=NL(u_C(CD_i, t))-NL(u_M(CD_i, t))-NL(u_R(CD_i, t+\tau_R))$ (8)

where $u_C(CD_k, t)=u_M(CD_k, t)+u_R(CD_k, t+\tau_R)$.

As such, the correlation values between the received optical signal and the signal templates determined by the correlation module 350 may have non-negligible values for segments that are located between the MPI source 505 and the receiving device 120, where the third component of the optical signal 300 exists, thereby indicating a location of the MPI source 505 in the optical communication line 105. Experimental results are described in greater details herein after.

Figure 6:
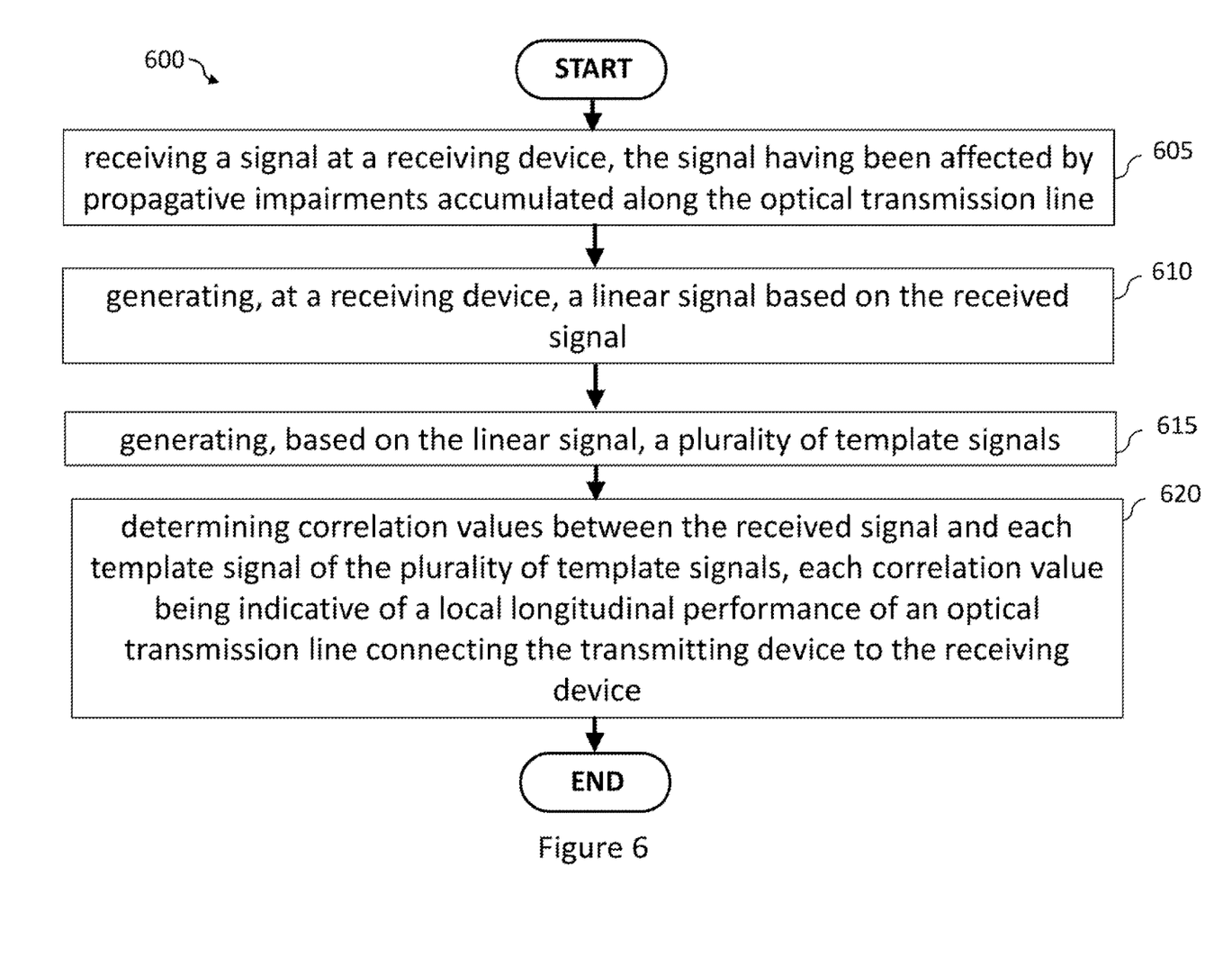
FIG. 6 is a flow diagram showing operations of a method for longitudinal performance monitoring of the optical communication line of FIG. 2 in accordance with some embodiments of the present technology.

With reference to FIG. 6, a method 600 for longitudinal performance monitoring of the optical communication line 105 is illustrated in the form of a flowchart. In one or more aspects, the method 600 is performed by a controller 700 (FIG. 7) of the receiving device 120 or any other device that may be communicably connected thereto. In some implementations, one of more operations of the method 600 could be implemented, in whole or in part, by another computer-implemented device. It is also contemplated that the method 600 or one or more operation thereof may be embodied in computer-executable instructions that are stored in a computer-readable medium, such as a non-transitory mass storage device, loaded into memory and executed by a processor, such as the controller 700. Some operations or portions of operations in the flow diagram may be possibly being executed concurrently, omitted or changed in order.

The method 600 comprises receiving, at operation 605, the optical signal 300 having been affected by propagative impairments accumulated along the optical communication line 105. In one embodiment, the propagative impairments are chromatic dispersions and non-linear distortions. Based on equation (4), the received optical signal 300 may be expressed as $$u_{NL}(CD_N, t) = u(CD_N, t) + \sum_{k=1}^{N} P_i \Delta u_{NL}(CD_i, t).$$

The receiving device 120 may use the sensing device 310 coupled with the Analog-to-Digital Convert 321 to generate the digital signal 332 representative of the optical signal 300.

The method 600 continues with generating, at operation 610, the linear signal $u(CD_N, t)$ 332 based on the received optical signal 300. In this embodiment, the symbol decision module 330 may execute symbol decision procedures to generate the digital signal 332 representative of the linear part of the optical signal 300. In the context of the present disclosure, the linear signal $u(CD_N, t)$ 332 and the signal 322 are digital signals, and are treated as the respective analogue signals that they represent, for simplicity and clarity of mathematical operations. As such, a mathematical expression of the digital signal 322 may be $$u_{NL}(CD_N, t) = u(CD_N, t) + \sum_{k=1}^{N} P_i \Delta u_{NL}(CD_i, t)$$

and a mathematical expression of the digital signal 332 may be $u(CD_N, t)$.

The method 600 continues with generating, based on the linear signal 332, a plurality of signal templates at operation 615. In this embodiment, each signal template corresponds to one of the segments such that the performance monitoring module 340 generates N signal templates where N is the number of segments defined along the optical communication line 105.

In this embodiment, the receiving device 120 may determine, via the DSP 320, the total chromatic dispersion CD accumulated by the received optical signal 300 between the transmitting device 110 and the receiving device 120. Given that, in the context of the present technology, accumulation of chromatic dispersion is considered as a linear propagative impairment, the first chromatic dispersion module 344 may further generate, for each segment i, the signal $u(CD_i, t)$ indicative of a waveform of the linear part of the optical signal 300 at segment i. Indeed, it is contemplated that the amount $\Delta CD = CD_N/N$ of chromatic dispersion has been linearly accumulated by the optical signal 300 at each segment i along the optical communication line 105. As such, in this embodiment and for a given segment i, the first chromatic dispersion module 344 may further generate the linear signal $u(CD_i, t)$ by compensating chromatic dispersion of the linear signal $u(CD_N, t)$ 332 by an amount of $-(CD_N-CD_k)$ such that the latter has an amount of chromatic dispersion equal to $CD_i = \Delta CD \cdot i$. In this embodiment, the first chromatic dispersion module 344 executes the operator H such that $H(u(CD_N, t), -(CD_N-CD_k)) = u(CD_k, t)$.

In one embodiment, the template generator 345 executes a non-linear distortion operation onto the linear signal $u(CD_i, t)$ to emulate non-linear distortions affecting the optical signal 300 at the location of the segment i, thereby generating the non-linear distortion $-j\gamma|u(CD_i, t)|^2 u(CD_i, t)$. The second chromatic dispersion module 346 may execute the following operation to add residual chromatic dispersion to the non-linear distortion: $H(-j\gamma|u(CD_k, t)|^2 u(CD_k, t), CD_N-CD_k)$.

As such, the template generator 345 may execute, in collaboration with the first and second chromatic dispersion modules 344, 346, the operator H as described in equation (5) to the generated waveform to emulate an accumulation of chromatic dispersion by the non-linear distortion between the location of the segment i and the receiving device 120. As such, the signal template for the segment i is, in this embodiment, $T_P(CD_i) = \Delta u_{NL}(CD_i, t) = H(-j\gamma|u(CD_i, t)|^2 u(CD_i, t), CD_N-CD_i)$.

Other definitions of the signal templates are contemplated in alternative implementations of the present technology. In some embodiments, the template generator 345 may be configured to generate a plurality of signal templates for each segment of the optical communication line 105. For example, the template generator may generate three signal templates having distinct definitions for each of the N segments, thereby generating 3N signal templates.

As another example, the template generator 345 may generate signal templates under the form of $T_{MPI}(CD_k) = NL(u_C(CD_k, t)) - N(u_M(CD_k, t)) - NL(u_R(CD_k, t+\tau_R))$ as described at equation (8).

The method 600 ends with determining, at operation 620, correlation values between the received optical signal 300 and each signal template of the plurality of signal templates, each correlation value being indicative of a local longitudinal performance of the optical communication line 105. For example, the correlation value between a given signal template $T_P(CD_i)$ and the received optical signal 300 is indicative of a power of the optical signal 300 at the segment i. As another example, the correlation value between a given signal template $T_{MPI}(CD_i)$ and the received optical signal 300 is indicative of non linear distortions generated by a combination of (e.g. interferences between) the main signal and the reflected signal caused by the MPI source 505 at the segment i. As such, local longitudinal performance of the optical communication line 105 may be determined based on an evolution of the correlation values. The method 600 may enable localization of sources of other local impairments due to the flexibility of the definition of the template.

It will be appreciated that at least some of the operations of the method 600 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

Figure 7:
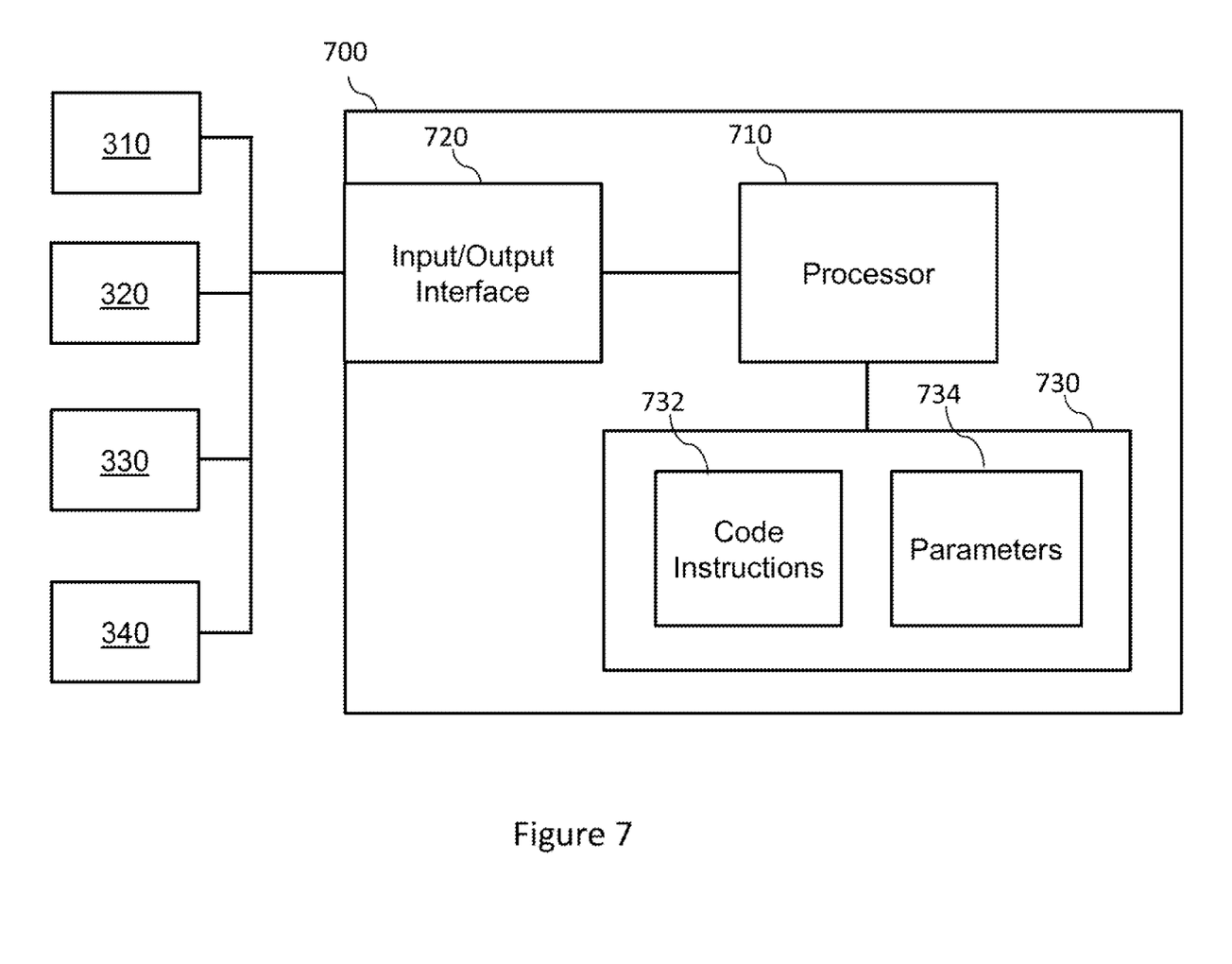
FIG. 7 is block diagram of a controller in accordance with an embodiment of the present technology.

As an example, FIG. 7 is a schematic block diagram of the controller 700 of the data receiver 100 according to an embodiment of the present technology. The controller 700 comprises a processor or a plurality of cooperating processors (represented as a processor 710 for simplicity), a memory device or a plurality of memory devices (represented as a memory device 730 for simplicity), and a input/output interface 720 allowing the controller 700 to communicate with other components of the receiving device 120 and/or other components in remote communication with the receiving device 120. The processor 710 is operatively connected to the memory device 730 and to the input/output interface 720. The memory device 730 includes a storage for storing parameters 734, including for example and without limitation the above-mentioned pre-determined number N of segments and the nonlinear coefficient γ. The memory device 730 may comprise a non-transitory computer-readable medium for storing code instructions 732 that are executable by the processor 710 to allow the controller 700 to perform the various tasks allocated to the controller 700 in the method 600.

The controller 700 is operatively connected, via the input/output interface 720, to the sensing device 310, the DSP 320, the symbol decision module 330 and the performance monitoring module 340. The controller 700 executes the code instructions 732 stored in the memory device 730 to implement the various above-described functions that may be present in a particular embodiment. FIG. 7 as illustrated represents a non-limiting embodiment in which the controller 700 orchestrates operations of the sensing device, the DSP 320, the symbol decision module 330 and the performance monitoring module 340. This particular embodiment is not meant to limit the present disclosure and is provided for illustration purposes.

Figure 8:
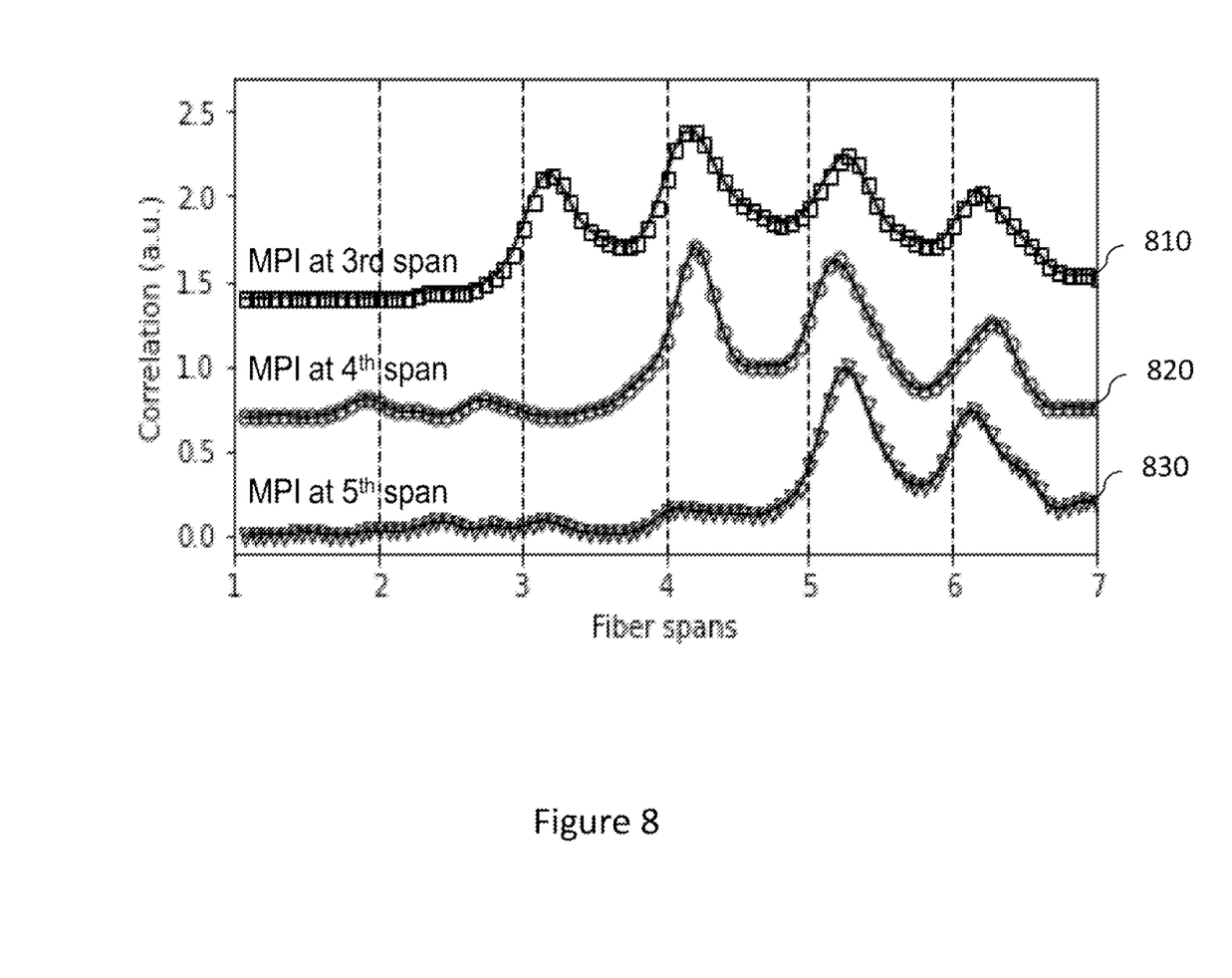
FIG. 8 is a graph showing experimental measurements of correlation values for different location of a Multi-Path Interference source in the optical communication line of FIG. 2.

FIG. 8 is a graph showing experimental measurements of correlation values for different location of a Multi-Path Interference source in the optical communication line 105. In this example, the graph comprises a first curve 810, a second curve 820 and a third curve 830. Each point of those curves is a correlation value between the received optical signal 300 and a given signal template $T_{MPI}(CD_i)$ generated by the performance monitoring module 340. The first curve 810 has been determined for the optical communication line 105 having a first MPI source located at a third span the optical communication line 105. Similarly, the second curve 820 has been determined for the optical communication line 105 having a second MPI source located at a fourth span the optical communication line 105. Finally, the third curve 830 has been determined for the optical communication line 105 having a third MPI source located at a fifth span the optical communication line 105. Evolution of the correlation values enable an operator to determine where these three MPI sources are located. As previously described, other definitions of the signal templates may be used to determine a location of a local impairment different from an MPI source in alternative embodiments.

It is to be understood that the operations and functionality of the described receiving device 120, its constituent components, and associated processes may be achieved by any one or more of hardware-based, software-based, and firmware-based elements. Such operational alternatives do not, in any way, limit the scope of the present disclosure.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for longitudinal performance monitoring of an optical communication line communicably connecting a transmitting device to a receiving device for transmitting a signal therebetween, the method comprising:
   receiving the signal at the receiving device, the signal having been affected by propagative impairments accumulated along the optical communication line;
   generating, at the receiving device, a linear signal based on the received signal;
   obtaining, based on the linear signal, a plurality of signal templates; and
   determining correlation values between the received signal and each signal template of the plurality of signal templates, each correlation value being indicative of a local longitudinal performance of the optical communication line.

2. The method of claim 1, wherein a plurality of segments is defined along the optical communication line, each signal template corresponding to one of the plurality of segments, each signal template approximating an expression of an impairment affecting the signal between a location of the corresponding segment and the receiving device.

3. The method of claim 2, wherein the expression of the impairment affecting the signal is an expression of accumulated non-linear distortions of the signal between the location of the corresponding segment and the receiving device.

4. The method of claim 3, wherein the correlation values are indicative of a power distribution of the signal along the optical communication line.

5. The method of claim 2, wherein the propagative impairments comprise chromatic dispersion and non-linear distortions, and wherein obtaining, based on the linear signal, a plurality of signal templates comprises:
 determining, at the receiving device, a total chromatic dispersion accumulated by the received signal between the transmitting device and the receiving device, each segment of the optical communication line adding a corresponding portion of the total chromatic dispersion; and
 for a given signal template of the plurality of signal templates:
  determining, based on a location of the segment corresponding to the given signal template and on the total chromatic dispersion, a waveform of the linear signal at the location of the segment;
  executing a non-linear distortion operation onto said waveform, the non-linear distortion operation emulating non-linear distortions affecting the signal at the location of the segment, thereby generating a non-linear signal; and
 executing a chromatic dispersion operation to the non-linear signal, the chromatic dispersion operation emulating an accumulation of chromatic dispersion by the non-linear signal between the location of the segment and the receiving device, thereby generating the given signal template.

6. The method of claim 2, further comprising determining, based on an evolution of the correlation values along the optical communication line, a location of a source of a local impairment in the optical communication line.

7. The method of claim 6, wherein the source of the local impairment is a set of points of the optical communication line causing partial reflection of the signal and causing Multi-Path Interference, MPI, occurring in the optical communication line, the MPI occurring between a first component of the signal and a second component of the signal, the second component of the signal having been reflected at least twice in the optical communication line, the MPI thereby generating non-linear distortions corresponding to interferences between the first and second components of the signal.

8. The method of claim 7, wherein each signal template is representative of non-linear distortion accumulated between a location of the corresponding segment and the receiving device.

9. The method of claim 7, wherein obtaining, based on the linear signal, a plurality of signal templates comprises:
 determining, at the receiving device, a total chromatic dispersion accumulated by the received signal between the transmitting device and the receiving device, each segment of the optical communication line adding a corresponding portion of the total chromatic dispersion; and
 for a given signal template of the plurality of signal templates:
  determining, based on a location of the segment corresponding to the given signal template and on the total chromatic dispersion, waveforms of the first, second and third components of the signal at the location of the segment; and
 executing a non-linear distortion operation onto said waveforms, the non-linear distortion operation emulating non-linear distortions at the location of the segment, thereby generating the given signal template.

10. The method of claim 1, wherein receiving the signal at the receiving device comprises collecting the signal with an optical photodetector and converting an output of the optical photodetector into a digital signal by an analogue-to-digital converter.

11. The method of claim 1 wherein generating the linear signal comprises executing, by a signal processor, a logic symbol decision procedure on the received signal.

12. The method of claim 1, further comprising, subsequent to obtaining the plurality of signal templates, applying a signal frequency filter to the received signal and the plurality of signal templates.

13. The method of claim 1, wherein determining correlation values between the received signal and each signal template of the plurality of signal templates comprises, for a given signal template:
 executing a bilinear correlation operation using the received signal and the given signal template as parameters, the correlation operation outputting a non-null value for portions of the parameters that are in common and a null value otherwise.

* * * * *